(12) United States Patent
Shrago

(10) Patent No.: US 10,717,456 B2
(45) Date of Patent: Jul. 21, 2020

(54) DEPLOYABLE STOOL SYSTEM

(71) Applicant: Ian Shrago, Bell Canyon, CA (US)

(72) Inventor: Ian Shrago, Bell Canyon, CA (US)

( * ) Notice: Subject to any disclaimer, the term of this patent is extended or adjusted under 35 U.S.C. 154(b) by 171 days.

(21) Appl. No.: 15/790,420

(22) Filed: Oct. 23, 2017

(65) Prior Publication Data

US 2019/0118846 A1 Apr. 25, 2019

(51) Int. Cl.
*B62B 5/08* (2006.01)
*A47C 12/00* (2006.01)
*B62B 3/14* (2006.01)

(52) U.S. Cl.
CPC ............ *B62B 5/087* (2013.01); *A47C 12/00* (2013.01); *B62B 3/14* (2013.01)

(58) Field of Classification Search
CPC ............ B62B 5/087; B62B 3/14; A47C 12/00
See application file for complete search history.

(56) References Cited

U.S. PATENT DOCUMENTS

| | | | | |
|---|---|---|---|---|
| 3,341,223 A * | 9/1967 | Wampfler | ................ | B60R 3/02 182/88 |
| 3,671,058 A * | 6/1972 | Kent | ................ | B60R 3/02 280/166 |
| 4,190,280 A * | 2/1980 | Donohoe | ................ | A61G 1/04 280/32.7 |
| 4,504,073 A | 3/1985 | isaacs | | |
| 4,610,454 A | 9/1986 | Gill | | |
| 4,736,689 A * | 4/1988 | Stanko | ................ | A47B 21/0314 108/143 |
| 4,758,007 A | 7/1988 | Reck | | |
| 5,005,667 A * | 4/1991 | Anderson | ................ | A47B 77/10 182/15 |
| 5,040,467 A * | 8/1991 | King | ................ | B60P 3/32 108/42 |
| 5,342,073 A * | 8/1994 | Poole | ................ | B60R 3/02 105/449 |
| 5,375,962 A * | 12/1994 | Kempf | ................ | B60R 3/02 414/539 |
| 6,550,084 B2 * | 4/2003 | Siepmann | ................ | A47C 16/02 5/507.1 |
| 6,659,485 B2 * | 12/2003 | Ueno | ................ | B60R 3/02 182/98 |
| 6,766,547 B1 * | 7/2004 | Lagassey | ................ | A61G 1/0567 5/507.1 |
| 6,880,843 B1 * | 4/2005 | Greer, Jr. | ................ | B60R 3/02 280/166 |
| 7,168,722 B1 * | 1/2007 | Piotrowski | ................ | B60R 3/02 280/166 |
| 7,386,899 B2 * | 6/2008 | Smith | ................ | A61G 13/0018 5/507.1 |
| 7,784,406 B2 * | 8/2010 | Chisena | ................ | B61K 13/04 104/28 |
| 8,177,247 B1 * | 5/2012 | Carr | ................ | B60R 3/02 280/163 |
| 8,533,877 B2 * | 9/2013 | Weiler | ................ | A61B 5/0555 5/601 |

(Continued)

*Primary Examiner* — John D Walters
*Assistant Examiner* — James J Triggs

(57) ABSTRACT

A deployable stool system for slidably attaching a step to a cart includes a cart that may be rolled along a support surface. A step unit is coupled to the cart and the step unit is selectively positioned in a deployed position. Thus, the step unit may support a user thereby increasing the user's reach. The step unit is selectively positioned in a stored position.

8 Claims, 5 Drawing Sheets

(56) References Cited

U.S. PATENT DOCUMENTS

| | | | |
|---|---|---|---|
| D698,114 S | 1/2014 | Smith et al. | |
| 9,828,014 B1* | 11/2017 | Gillespie | B62B 3/14 |
| 10,011,290 B2* | 7/2018 | Abel | B62B 3/005 |
| 10,022,283 B2* | 7/2018 | Lawless | A61G 7/053 |
| 10,315,678 B2* | 6/2019 | Jones | B62B 3/1412 |
| 2005/0017466 A1 | 1/2005 | Dolin et al. | |
| 2006/0145436 A1 | 7/2006 | Varricchio | |
| 2007/0200313 A1* | 8/2007 | Tazreiter | B60R 3/02 280/166 |
| 2008/0250966 A1* | 10/2008 | Hirtenlehner | B60R 3/02 105/444 |
| 2010/0059947 A1 | 3/2010 | Shaw | |

\* cited by examiner

DEPLOYABLE STOOL SYSTEM

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION (1) Field of the Invention (2) Description of Related Art Including Information Disclosed Under 37 CFR 1.97 and 1.98

The disclosure and prior art relates to stool devices and more particularly pertains to a new stool device for slidably attaching a step to a cart.

BRIEF SUMMARY OF THE INVENTION

An embodiment of the disclosure meets the needs presented above by generally comprising a cart that may be rolled along a support surface. A step unit is coupled to the cart and the step unit is selectively positioned in a deployed position. Thus, the step unit may support a user thereby increasing the user's reach. The step unit is selectively positioned in a stored position.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
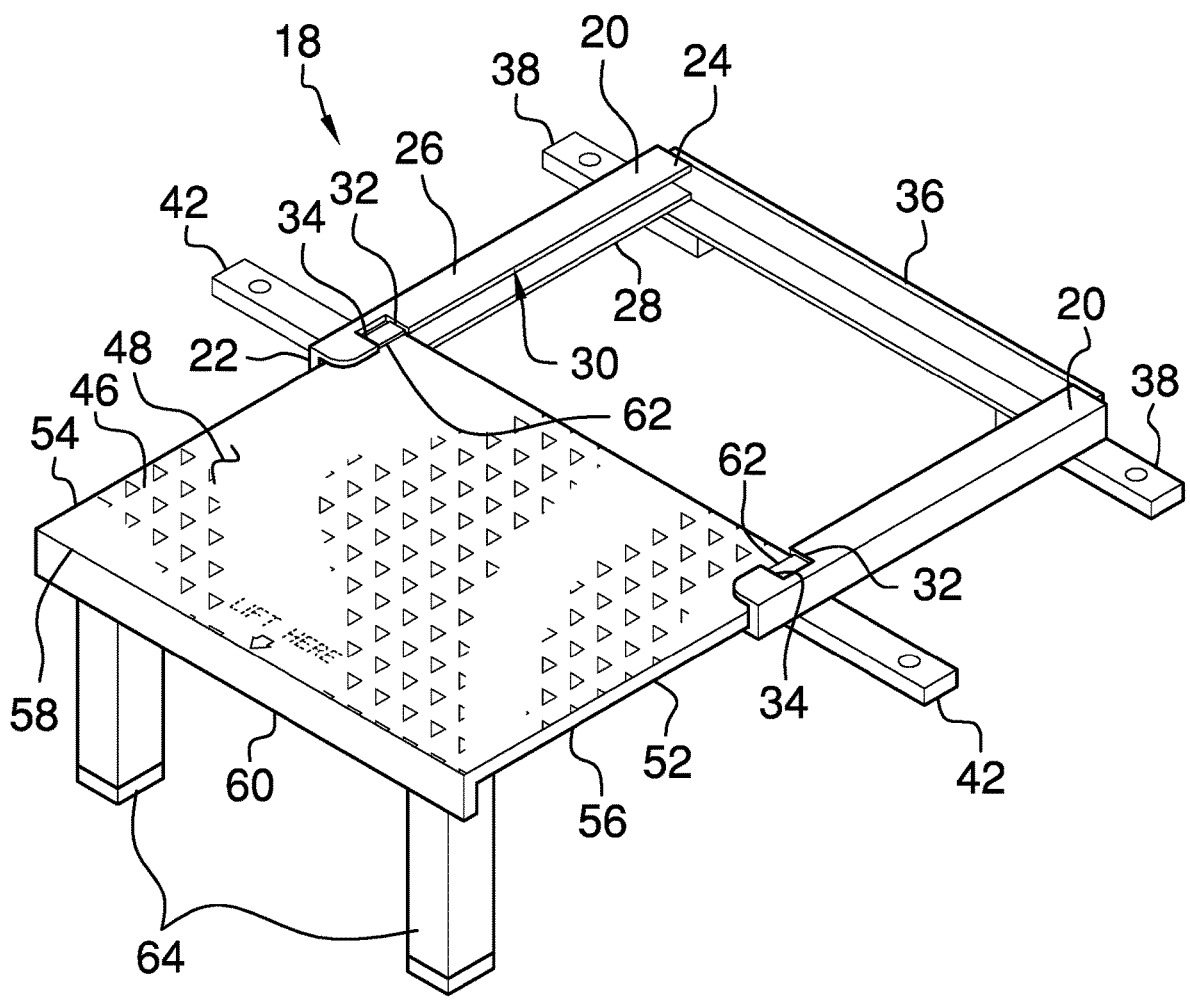
FIG. 1 is a top perspective view of step unit of a deployable stool system according to an embodiment of the disclosure.
Figure 2:
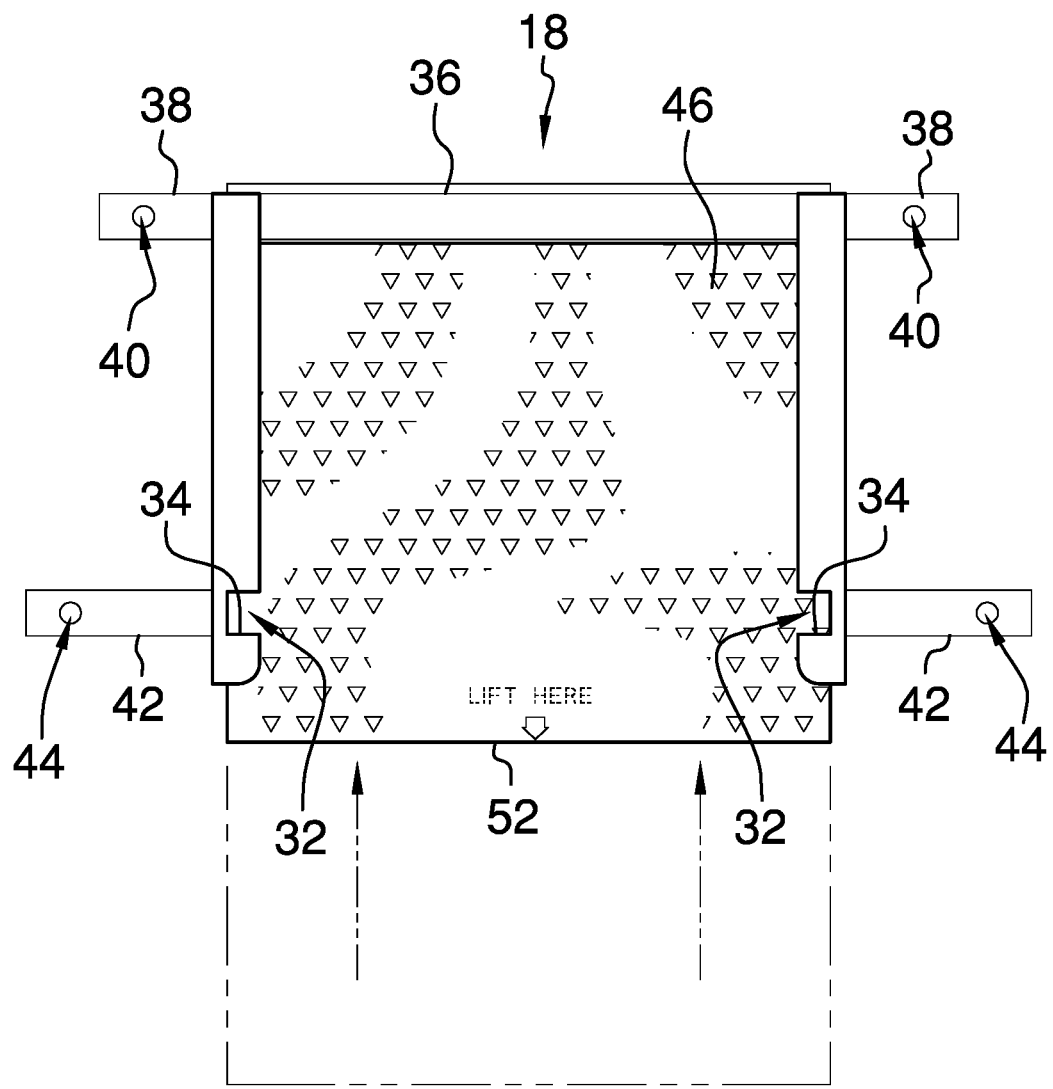
FIG. 2 is a top view of a step unit of an embodiment of the disclosure in a stored position.
Figure 3:
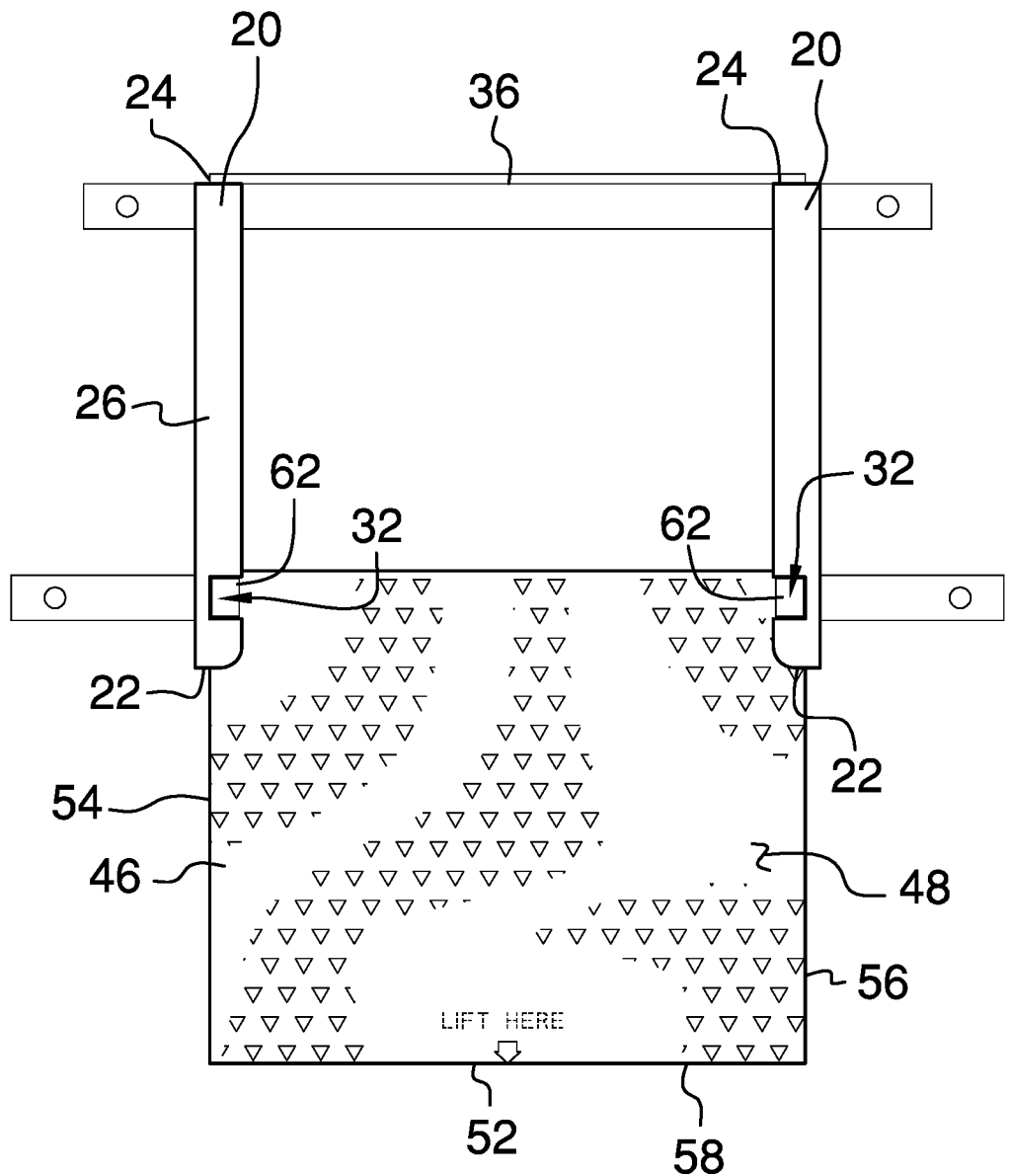
FIG. 3 is a top view of step unit of an embodiment of the disclosure in a deployed position.
Figure 4:
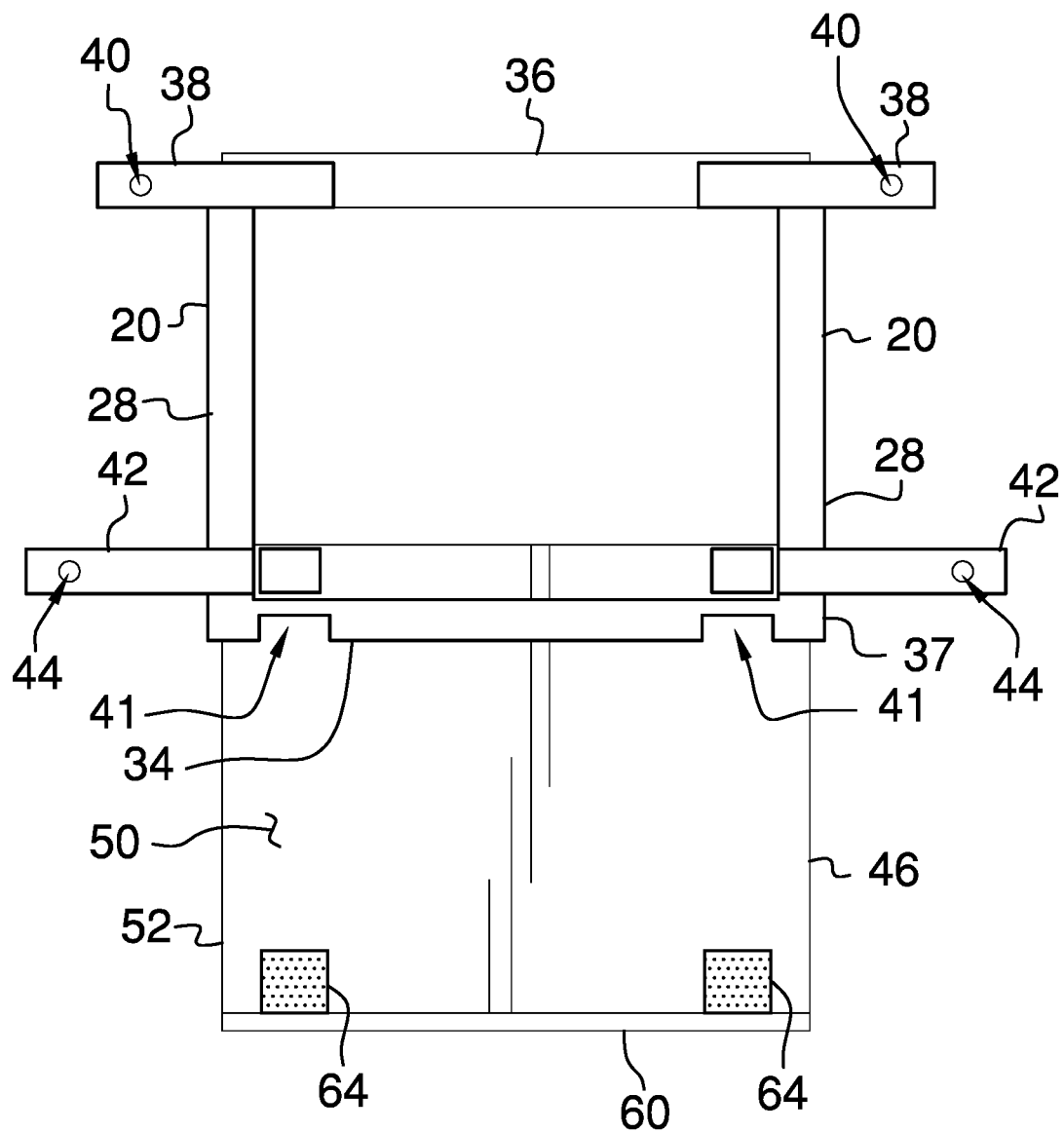
FIG. 4 is a bottom view of an embodiment of the disclosure.
Figure 5:
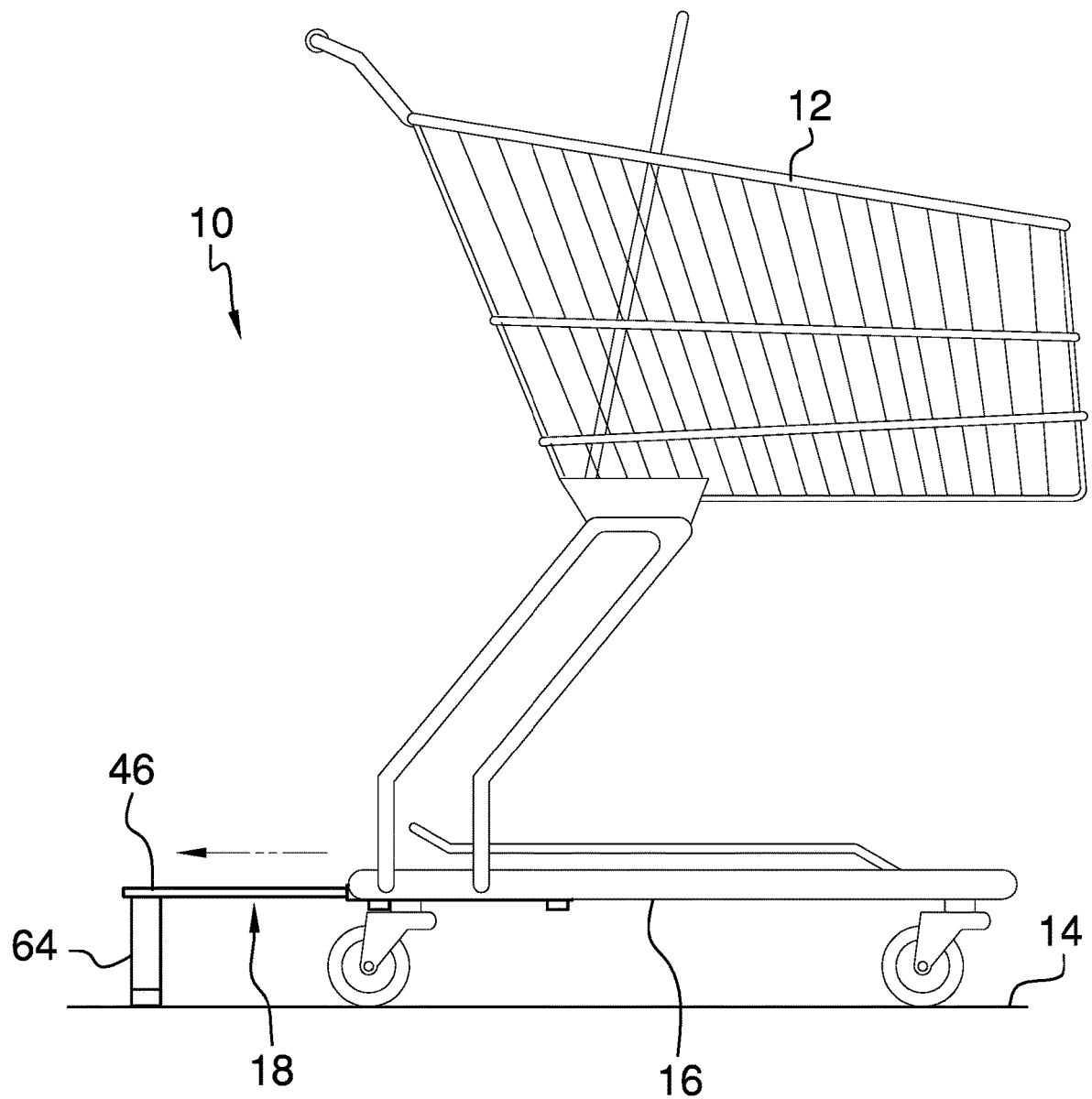
FIG. 5 is a perspective in-use view of an embodiment of the disclosure.

With reference now to the drawings, and in particular to FIGS. 1 through 5 thereof, a new stool device embodying the principles and concepts of an embodiment of the disclosure and generally designated by the reference numeral 10 will be described.

As best illustrated in FIGS. 1 through 5, the deployable stool system 10 generally comprises a cart 12 that is selectively rolled along a support surface 14. The cart 12 has a bottom side 16 and the cart 12 may be a shopping cart 12 or the like. Additionally, the cart 12 may be employed in a retail environment such as a grocery store or the like. A step unit 18 is coupled to the cart 12 and the step unit 18 is selectively positioned in a deployed position. Thus, a user may stand on the step unit 18 thereby increasing the user's reach. The step unit 18 is selectively positioned in a stored position.

The step unit 18 comprises a pair of tracks 20 that each has a first end 22, a second end 24, a top wall 26 extending between the first end 22 and the second end 24 and a bottom wall 28 extending between the first end 22 and the second end 24. The top wall 26 corresponding to each of the tracks 20 is spaced from the bottom wall 28 of the corresponding track to define a step space 30 in each of the tracks 20. The top wall 26 corresponding to each of the tracks 20 has a notch 32 therein. The notch 32 corresponding to each of the tracks 20 is positioned closer to the first end 22 than the second end 24 of the corresponding track. Additionally, the notch 32 corresponding each of the tracks 20 has a first bounding edge 34.

A first member 36 is coupled between each of the tracks 20. The first member 36 spaces the tracks 20 apart from each other having the step space 30 in each of the tracks 20 facing each other. The first member 36 is aligned with the second end 24 of each of the tracks 20. A pair of first arms 38 is provided and each of the first arms 38 is coupled to and extends laterally away from the first member 36. Each of the first arms 38 is oriented to be collinear with the first member 36. Each of the first arms 38 has a first aperture 40 extending therethrough and each of the first arms 38 abuts the bottom side 16 of the cart 12. A fastener, such as a bolt or the like, is extended through the first aperture 40 in each of the first arms 38 and engages the cart 12 to retain the tracks 20 on the cart 12.

A second member 37 is coupled between each of the tracks 20 and the second member 37 is aligned with the first end 22 of each of the tracks 20. The second member 37 is positioned on the bottom wall 28 corresponding to each of the tracks 20. The second member 37 has a first edge 39 and the first edge 39 has a pair of slots 41 extending therein.

A pair of second arms 42 is each coupled to and extends laterally away from and associated one of the tracks 20. Each of the second arms 42 is positioned on the bottom wall 28 of the associated track and each of the second arms 42 is oriented to be perpendicular with the associated track. Each of the second arms 42 is spaced from an associated one of the first arms 38. Additionally, each of the second arms 42 has a second aperture 44 extending therethrough and each of the second arms 42 abuts the bottom side 16 of the cart 12. A fastener, such as a bolt or the like, is extended through the second aperture 44 in each of the second arms 42 and engages the cart 12 to retain the tracks 20 on the cart 12.

A step 46 is provided and the step 46 is slidably positioned in the tracks 20. The step 46 has a top surface 48, a bottom surface 50 and a peripheral edge 52 extending therebetween. The peripheral edge 52 has a first lateral side 54, a second lateral side 56 and a front side 58. Each of the first lateral side 54 and the second lateral side 56 is positioned in the step space 30 in an associated one of the tracks 20.

A lip 60 extends downwardly from the bottom surface 50 of the step 46 for gripping and the lip 60 is coextensive with the front side 58 of the step 46. The lip 60 abuts the first end 22 of each of the tracks 20 when the step unit 18 is positioned in the stored position such that the step 46 is positioned beneath the cart 12. The step 46 extends outwardly from the first end 22 of each of the tracks 20 when the step unit 18 is positioned in the deployed position such that the step 46 extends outwardly from the cart 12.

A pair of stops 62 is provided and each of the stops 62 extends upwardly from the top surface 48 of the step 46. Each of the stops 62 is aligned with an associated one of the first lateral side 54 and the second lateral side 56 of the step 46. Each of the stops 62 engages the first bounding edge 34 of the notch 32 in an associated one of the tracks 20 when the step unit 18 is positioned in the deployed position. In this way the step 46 is inhibited from being removed from the tracks 20. The top surface 48 of the step 46 may be textured to enhance traction for standing on the step 46.

A pair of legs 64 is provided and each of the legs 64 is coupled to and extends downwardly from the bottom surface 50 of the step 46. Each of the legs 64 abuts the support surface 14 when the step unit 18 is positioned in the deployed position. Additionally, each of the legs 64 is aligned with the lip 60. The step 46 is supported by the second member 37 and each of the legs 64 when the step 46 is slid outwardly from the tracks 20. Each of legs 64 is positioned in an associated one of the slots 41 in the second member 37 when the step 46 is slid inwardly on the tracks 20.

In use, the cart 12 is pushed along the support surface 14 in the retail environment for holding items being purchased or the like. The lip 60 is selectively gripped with a foot or the like to urge the step 46 outwardly in the tracks 20. Thus, the user may stand on the step 46 to reach an item on a shelf or the like that is out of reach. The step 46 is selectively urged into the stored position to move the cart 12 along the support surface 14.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A deployable stool system including a shopping cart, said system comprising:

a cart being configured to be rolled along a support surface;

a step unit being coupled to said cart, said step unit being selectively positioned in a deployed position such that said step unit is extended from said cart wherein said step unit is configured to support a user thereby increasing the user's reach, said step unit being selectively positioned in a stored position;

wherein said step unit comprises a pair of tracks, each of said tracks having a first end, a second end, a top wall extending between said first end and said second end and a bottom wall extending between said first end and said second end, said top wall corresponding to each of said tracks being spaced from said bottom wall of said corresponding track to define a step space in each of said tracks; and wherein said top wall corresponding to each of said tracks has a notch therein, said notch corresponding to each of said tracks being positioned closer to said first end than said second end of said corresponding track.

2. A deployable stool system including a shopping cart, said system comprising:

a cart being configured to be rolled along a support surface;

a step unit being coupled to said cart, said step unit being selectively positioned in a deployed position such that said step unit is extended from said cart wherein said step unit is configured to support a user thereby increasing the user's reach, said step unit being selectively positioned in a stored position;

wherein said step unit comprises a pair of tracks, each of said tracks having a first end, a second end, a top wall extending between said first end and said second end and a bottom wall extending between said first end and said second end, said top wall corresponding to each of said tracks being spaced from said bottom wall of said corresponding track to define a step space in each of said tracks;

a member being coupled between each of said tracks such that said tracks are spaced apart from each other having said step space in each of said tracks facing each other, said member being aligned with said second and of each of said tracks; and a pair of first arms, each of said first arms being coupled to and extending laterally away from said member, each of said first arms being oriented to be collinear with said member, each of said first arms having a first aperture extending therethrough, each of said first arms abutting said bottom side of said cart.

3. The system according to claim 2, further comprising a pair of second arms, each of said second arms being coupled to and extending laterally away from and associated one of said tracks, each of said second arms being positioned on said bottom wall of said associated track, each of said second arms being oriented to be perpendicular with said associated track, each of said second arms being spaced from an associated one of said first arms each of said second arms having a second aperture extending therethrough, each of said second arms abutting said bottom side of said cart.

4. A deployable stool system including a shopping cart, said system comprising:
- a cart being configured to be rolled along a support surface;
- a step unit being coupled to said cart, said step unit being selectively positioned in a deployed position such that said step unit is extended from said cart wherein said step unit is configured to support a user thereby increasing the user's reach, said step unit being selectively positioned in a stored position;
- wherein said step unit comprises a pair of tracks, each of said tracks having a first end, a second end, a top wall extending between said first end and said second end and a bottom wall extending between said first end and said second end, said top wall corresponding to each of said tracks being spaced from said bottom wall of said corresponding track to define a step space in each of said tracks; and
- a step being slidably positioned in said tracks, said step having a top surface, a bottom surface and a peripheral edge extending therebetween, said peripheral edge having a first lateral side, a second lateral side and a front side, each of said first lateral side and said second lateral side being positioned in said step space in an associated one of said tracks.

5. The system according to claim 4, wherein said bottom surface has a lip extending downwardly therefrom wherein said lip is configured to be gripped, said lip being coextensive with said front side, said lip abutting said first end of each of said tracks when said step unit is positioned in said stored position such that said step is positioned beneath said cart, said step extending outwardly from said first end of each of said tracks when said step unit is positioned in said deployed position such that said step extends outwardly from said cart.

6. The system according to claim 5, further comprising:
- each of said tracks having a notch, said notch corresponding to each of said tracks having a first bounding edge; and
- a pair of stops, each of said stops extending upwardly from said top surface of said step, each of said stops being aligned with an associated one of said first lateral side than said second lateral side, each of said stops engaging said first bounding edge of said notch in an associated one of said tracks when said step unit is positioned in said deployed position such that said step is inhibited from being removed from said tracks.

7. The system according to claim 5, further comprising a pair of legs, each of said legs being coupled to and extending downwardly from said bottom surface of said step wherein each of said legs is configured to abut the support surface when said step unit is positioned in said deployed position, each of said legs being aligned with said lip.

8. The system of claim 1, further comprising:
- said cart having a bottom side; and
- said step unit comprising:
  - said notch corresponding each of said tracks having a first bounding edge,
  - a member being coupled between each of said tracks such that said tracks are spaced apart from each other having said step space in each of said tracks facing each other, said member being aligned with said second and of each of said tracks,
  - a pair of first arms, each of said first arms being coupled to and extending laterally away from said member, each of said first arms being oriented to be collinear with said member, each of said first arms having a first aperture extending therethrough, each of said first arms abutting said bottom side of said cart,
  - a pair of second arms, each of said second arms being coupled to and extending laterally away from and associated one of said tracks, each of said second arms being positioned on said bottom wall of said associated track, each of said second arms being oriented to be perpendicular with said associated track, each of said second arms being spaced from an associated one of said first arms each of said second arms having a second aperture extending therethrough, each of said second arms abutting said bottom side of said cart,
  - a step being slidably positioned in said tracks, said step having a top surface, a bottom surface and a peripheral edge extending therebetween, said peripheral edge having a first lateral side, a second lateral side and a front side, each of said first lateral side and said second lateral side being positioned in said step space in an associated one of said tracks,
  - a lip extending downwardly from said bottom surface of said step wherein said lip is configured to be gripped, said lip being coextensive with said front side of said step, said lip abutting said first end of each of said tracks when said step unit is positioned in said stored position such that said step is positioned beneath said cart, said step extending outwardly from said first end of each of said tracks when said step unit is positioned in said deployed position such that said step extends outwardly from said cart,
  - a pair of stops, each of said stops extending upwardly from said top surface of said step, each of said stops being aligned with an associated one of said first lateral side than said second lateral side, each of said stops engaging said first bounding edge of said notch in an associated one of said tracks when said step unit is positioned in said deployed position such that said step is inhibited from being removed from said tracks, and
  - a pair of legs, each of said legs being coupled to and extending downwardly from said bottom surface of said step wherein each of said legs is configured to abut the support surface when said step unit is positioned in said deployed position, each of said legs being aligned with said lip.

* * * * *